United States Patent
Cheng

(10) Patent No.: US 12,455,693 B2
(45) Date of Patent: Oct. 28, 2025

(54) MEMORY SYSTEMS AND OPERATION METHODS THEREOF, HOST AND OPERATION METHODS THEREOF, AND ELECTRONIC APPARATUSES

(71) Applicant: Yangtze Memory Technologies Co., Ltd., Hubei (CN)

(72) Inventor: Quan Cheng, Hubei (CN)

(73) Assignee: YANGTZE MEMORY TECHNOLOGIES CO., LTD., Hubei (CN)

( * ) Notice: Subject to any disclaimer, the term of this patent is extended or adjusted under 35 U.S.C. 154(b) by 20 days.

(21) Appl. No.: 18/404,630

(22) Filed: Jan. 4, 2024

(65) Prior Publication Data

US 2025/0103219 A1    Mar. 27, 2025

(30) Foreign Application Priority Data

Sep. 21, 2023  (CN) .......................... 202311232680.5

(51) Int. Cl.
*H04L 9/08* (2006.01)
*G06F 3/06* (2006.01)
*G06F 21/31* (2013.01)

(52) U.S. Cl.
CPC .......... *G06F 3/0622* (2013.01); *G06F 3/0637* (2013.01); *G06F 3/0679* (2013.01); *G06F 21/31* (2013.01); *H04L 9/0869* (2013.01)

(58) Field of Classification Search
None
See application file for complete search history.

(56) References Cited

U.S. PATENT DOCUMENTS

| | | | | |
|---|---|---|---|---|
| 2009/0292918 A1* | 11/2009 | Mori | .................... | H04L 9/0894 |
| | | | | 713/168 |
| 2014/0245010 A1* | 8/2014 | Nagai | .................. | H04L 9/3234 |
| | | | | 713/171 |
| 2019/0222427 A1* | 7/2019 | Chen | ....................... | G06F 21/10 |

FOREIGN PATENT DOCUMENTS

CN           114527933 A   *   5/2022   .............   G06F 21/31

* cited by examiner

*Primary Examiner* — Fatoumata Traore
(74) *Attorney, Agent, or Firm* — HANLEY, FLIGHT & ZIMMERMAN, LLC

(57) ABSTRACT

The present disclosure provide an example memory system, including: a memory configured to store key information; and a memory controller coupled with the memory and configured to: generate first authentication information according to first dynamic information and a first key determined from the key information; receive second authentication information from a host, wherein the second authentication information is generated according to the first dynamic information and a second key in the host; determine whether the first authentication information matches the second authentication information; in response to a mismatch of the first authentication information and the second authentication information, generate second dynamic information; update the first authentication information according to the second dynamic information and the first key; and receive updated second authentication information from the host, wherein the updated second authentication information is generated according to the second dynamic information and an updated second key in the host.

20 Claims, 6 Drawing Sheets

MEMORY SYSTEMS AND OPERATION METHODS THEREOF, HOST AND OPERATION METHODS THEREOF, AND ELECTRONIC APPARATUSES

CROSS REFERENCE TO RELATED APPLICATIONS

This application claims priority to and the benefit of Chinese Patent Application 202311232680.5, filed on Sep. 21, 2023, which is hereby incorporated by reference in its entirety.

TECHNICAL FIELD

The present disclosure relates to, but is not limited to, a memory system and an operation method thereof, a host and an operation method thereof, an electronic apparatus, and a computer readable storage medium.

BACKGROUND

With rapid development of data storage technologies, increasingly more data memory systems are present in electronic apparatuses used by people, e.g., Solid State Drives (SSDs), etc. The SSD is widely applied in fields such as military, vehicles, industry, medicine, aviation, etc. due to the advantages thereof, such as fast read and write speeds, shock resistance, low power consumption, no noise, low heat, light weight, etc.

DETAILED DESCRIPTION

Figure 1:
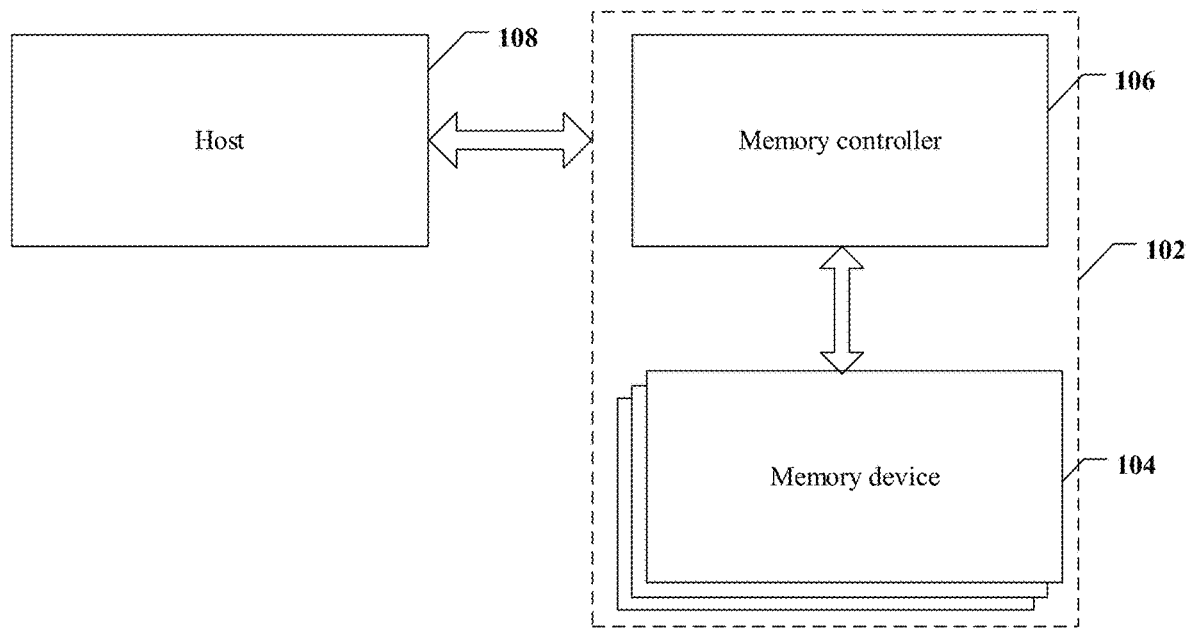
FIG. 1 is a schematic diagram of an example electronic apparatus having a memory system according to an example of the present disclosure.

Example implementations disclosed by the present disclosure will be described below in more detail with reference to the drawings. Although the example implementations of the present disclosure are shown in the drawings, it is to be understood that the present disclosure may be achieved in various forms which should not be limited by example implementations as set forth herein. Rather, these implementations are provided for a more thorough understanding of the present disclosure, and can fully convey the scope disclosed by the present disclosure to those skilled in the art.

In the following description, numerous example details are presented to provide a more thorough understanding of the present disclosure. However, it is apparent to those skilled in the art that the present disclosure may be practiced without one or more of these details. In other examples, in order to avoid confusing with the present disclosure, some technical features well-known in the art are not described; that is, not all features of actual examples are described herein, and well-known functions and structures are not described in detail.

In the drawings, sizes and relative sizes of layers, areas and elements may be exaggerated for clarity. Like reference numerals denote like elements throughout.

It is to be understood that when an element or a layer is referred to as being "on", "adjacent to", "connected to", or "coupled to" other elements or layers, it may be directly on, adjacent to, connected to, or coupled to the other elements or layers, or one or more intervening elements or layers may be present. In contrast, when an element is referred to as being "directly on", "immediately adjacent to", "directly connected to", or "directly coupled to" other elements or layers, no intervening elements or layers are present. It is to be understood that, although the terms first, second, third, etc., may be used to describe various elements, components, areas, layers and/or portions, these elements, components, areas, layers and/or portions should not be limited by these terms. These terms are only used to distinguish one element, component, area, layer or portion from another element, component, area, layer or portion. Thus, a first element, component, area, layer or portion discussed below may be represented as a second element, component, area, layer or portion, without departing from the teachings of the present disclosure. When the second element, component, area, layer or portion is discussed, it does not mean that the first element, component, area, layer or portion is necessarily present in the present disclosure.

The spatially relative terms, such as "beneath", "below", "lower", "under", "over", "upper", and the like, may be used herein for ease of description to describe one element or feature's relationship to other elements or features as illustrated in the figures. It is to be understood that, the spatially relative terms are intended to further encompass different orientations of a device in use or operation in addition to the orientation depicted in the figures. For example, if a device in the drawings is turned over, then an element or a feature described as "below other elements", or "under other elements", or "beneath other elements" will be orientated to be "above" the other elements or features. Thus, the example terms, "below" and "beneath", may include both upper and lower orientations. The device may be orientated otherwise (rotated by 90 degrees or other orientations), and the spatial descriptors used herein are interpreted accordingly.

The terms used herein are only intended to describe example implementations, and are not used as limitations of the present disclosure. As used herein, unless otherwise indicated expressly in the context, "a", "an" and "the" in a singular form are also intended to include a plural form. It is to also be understood that the terms "comprised of" and/or "comprise", when used in this specification, determine the presence of a feature, integer, step, operation, element and/or component, but do not preclude the presence or addition of one or more of other features, integers, steps, operations, elements, components, and/or groups. As used herein, the term "and/or" includes any and all combinations of the listed relevant items.

In order to be capable of understanding the characteristics and the technical contents of the examples of the present disclosure in more detail, implementation of the examples of the present disclosure is set forth in detail below in conjunction with the drawings, and the appended drawings are only used for reference and illustration, instead of being used to limit the examples of the present disclosure.

However, the memory systems in the related technology still have many problems to be solved.

FIG. 1 illustrates a block diagram of an example electronic apparatus 100 having a memory according to some aspects of the present disclosure. The electronic apparatus 100 may be a mobile phone, a desktop computer, a laptop computer, a tablet computer, a vehicle computer, a gaming console, a printer, a positioning apparatus, a wearable electronic apparatus, a smart sensor, a virtual reality (VR) apparatus, an Augmented Reality apparatus, or any other suitable electronic apparatuses having storages therein. As shown in FIG. 1, the electronic apparatus 100 may comprise a host 108 and a memory system 102, wherein the memory system 102 has one or more memory devices 104 and a memory controller 106. The host 108 may be a processor (e.g., a central processing unit) or a system on chip (e.g., an application processor) of an electronic apparatus. The host 108 may be configured to send or receive data to or from the memory devices 104.

According to some implementations, the memory controller 106 is coupled to the memory devices 104 and the host 108, and configured to control the memory devices 104. The memory controller 106 can manage data stored in the memory devices 104 and communicate with the host 108. In some implementations, the memory controller 106 is designed for operating in a low duty-cycle environment such as a secure digital card, a compact flash card, a universal serial bus flash drive, or other media for use in electronic apparatuses, such as a personal computer, a digital camera, and a mobile phone, etc. In some implementations, the memory controller 106 is designed for operating in a high duty-cycle environment SSD or an embedded multi-media card used as a data memory for mobile apparatuses, such as a smartphone, a tablet computer, and a laptop computer, etc., and an enterprise memory array.

The memory controller 106 may be configured to control operations of the memory devices 104, such as read, erase, and program operations. The memory controller 106 may be further configured to manage various functions with respect to data stored or to be stored in the memory devices 104, including, but not limited to, bad-block management, garbage collection, logical-to-physical address conversion, and wear leveling, etc. In some implementations, the memory controller 106 is further configured to process an Error Correction Code with respect to data read from or written to the memory devices 104. The memory controller 106 may further perform any other suitable functions, such as formatting the memory devices 104. The memory controller 106 may communicate with an external apparatus (e.g., the host 108) according to an example communication protocol. For example, the memory controller 106 may communicate with the external apparatus through at least one of various interface protocols, such as a USB protocol, an MMC protocol, a Peripheral Component Interconnect protocol, a Peripheral Component Interconnect Express protocol, an Advanced Technology Attachment protocol, a Serial Advanced Technology Attachment protocol, a Parallel Advanced Technology Attachment protocol, a Small Computer Small Interface protocol, an Enhanced Small Disk Interface protocol, an Integrated Drive Electronics protocol, and a firmware protocol, etc.

Figure 2A:
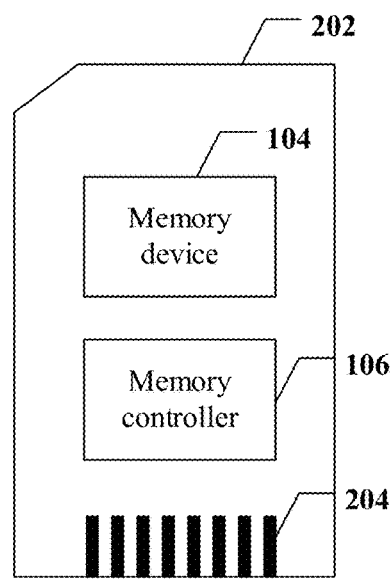
FIG. 2A is a schematic diagram of an example memory card having a memory system according to an example of the present disclosure.
Figure 2B:
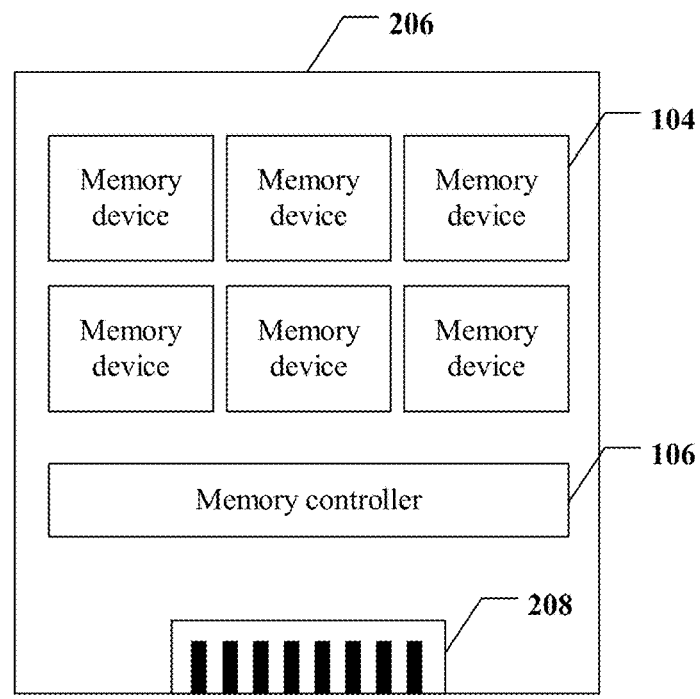
FIG. 2B is a schematic diagram of an example solid state drive having a memory system according to an example of the present disclosure.

The memory controller 106 and the one or more memory devices 104 can be integrated into various types of storage apparatuses, for example, be included in the same package (such as a Universal Flash Storage (UFS) package or an embedded Multi-Media Card package). That is, the memory system 102 can be implemented and packaged into different types of end electronic products. In an example as shown in FIG. 2A, the memory controller 106 and a single memory device 104 may be integrated into a memory card 202. The memory card 202 may include a Compact Flash Card, a Smart Media Card, a Memory Stick, a Multi-Media Card, a Secure Digital Card, and a UFS, etc. The memory card 202 may further comprise a memory card connector 204 coupling the memory card 202 with a host (e.g., the host 108 in FIG. 1). In another example as shown in FIG. 2B, the memory controller 106 and the plurality of memory devices 104 may be integrated into an SSD 206. The SSD 206 may further comprise an SSD connector 208 coupling the SSD 206 with a host (e.g., the host 108 in FIG. 1). In some implementations, a storage capacity and/or an operation speed of the SSD 206 are greater than a storage capacity and/or an operation speed of the memory card 202.

Figure 3:
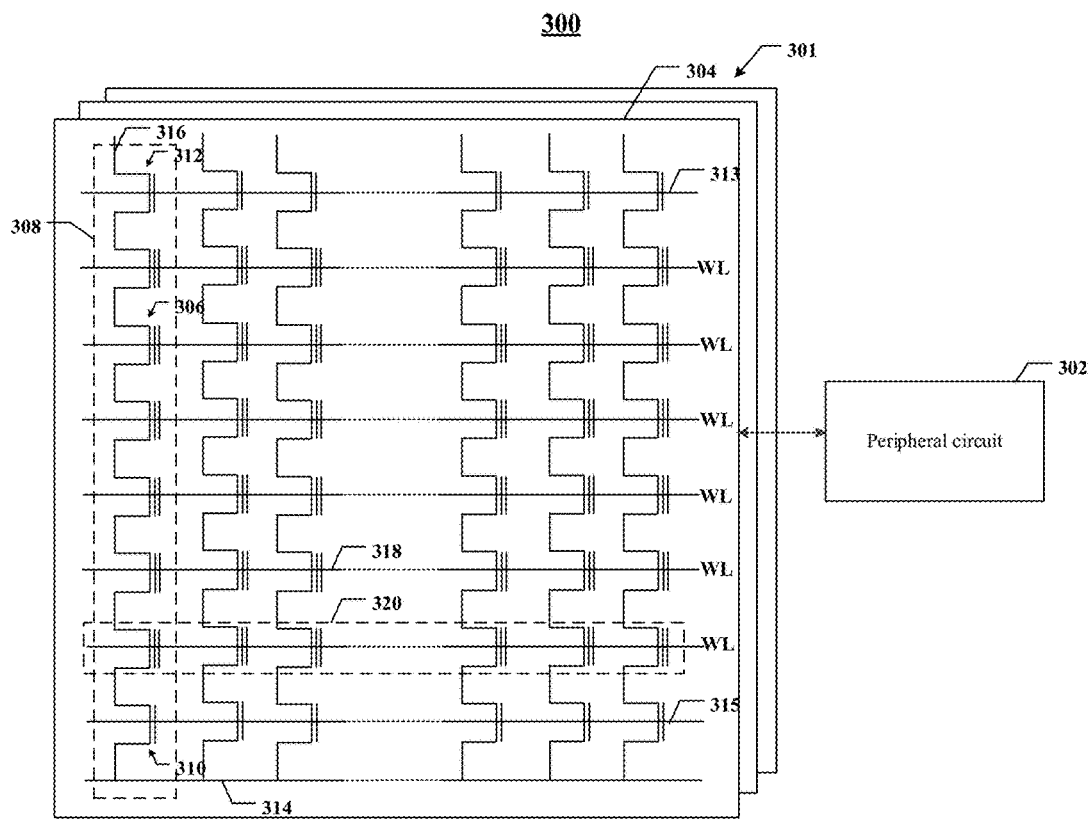
FIG. 3 is a schematic diagram of an example memory device comprising a peripheral circuit according to an example of the present disclosure.

FIG. 3 shows a schematic circuit diagram of an example memory device 300 comprising a peripheral circuit according to some aspects of the present disclosure. The memory device 300 may be an example of the memory devices 104 in FIG. 1. The memory device 300 may comprise a memory array 301 and a peripheral circuit 302 coupled to the memory array 301. The memory array 301 is described by taking a three-dimensional NAND memory array as an example, wherein memory cells 306 are NAND memory cells and provided in a form of an array of memory strings 308 each extending vertically above a substrate (not shown). In some implementations, each memory string 308 comprises a plurality of memory cells 306 that are coupled in series and stacked vertically. Each memory cell 306 may hold a continuous, analog value, such as a voltage or charge, that depends on a number of electrons trapped within a region of the memory cell 306. Each memory cell 306 may be either a floating gate memory cell that includes a floating gate transistor, or a charge trap memory cell that includes a charge trap transistor.

In some implementations, each memory cell 306 is a single level cell (SLC) that has two possible memory states and thus can store one bit of data. For example, a first memory state "0" may correspond to a first voltage range, and a second memory state "1" may correspond to a second voltage range. In some implementations, each memory cell 306 is a multiple level cell (MLC) that is capable of storing more than a single bit of data in more than four memory states. For example, the MLC can store two bits per cell, three bits per cell (also referred to as a triple level cell (TLC)), or four bits per cell (also referred to as a quad level cell (QLC)). Each MLC can be programmed to assume a range of possible nominal storage values. In an example, if each MLC stores two bits of data, the MLC can be programmed to take one of three possible programmed levels from an erased state by writing one of three possible nominal storage values to the cell. A fourth nominal storage value can be used for the erased state.

As shown in FIG. 3, each memory string 308 may comprise a Bottom Selected Transistor (BST) 310 at a source terminal thereof and a Top Selected Transistor (TST) 312 at a drain terminal thereof. The BST 310 and the TST 312 may be configured to activate a selected memory string 308 during read and program operations. In some implementations, sources of the memory strings 308 in the same memory block 304 are coupled through the same source line (SL) 314 (e.g., a common SL). In other words, according to some implementations, all the memory strings 308 in the same memory block 304 have an array common source (ACS). According to some implementations, the TST 312 of each memory string 308 is coupled to a corresponding bit line (BL) 316 which the data can be read from or written to via an output bus (not shown). In some implementations, each memory string 308 is configured to be selected or unselected by applying a select voltage (e.g., above a threshold voltage of a transistor having the TST 312) or an unselect voltage (e.g., 0 V) to the corresponding TST 312 via one or more Top Selected Lines (TSLs) 313 and/or by applying a select voltage (e.g., above a threshold voltage of a transistor having the BST 310) or an unselect voltage (e.g., 0 V) to the corresponding BST 310 via one or more Bottom Selected Lines (BSLs) 315.

As shown in FIG. 3, the memory strings 308 may be organized into a plurality of memory blocks 304, each of which may have a common source line 314 (e.g., coupled to the ground). In some implementations, each memory block 304 is a basic data unit for an erase operation, i.e., erasing is performed on all of the memory cells 306 on the same memory block 304 at the same time. In order to perform erasing on the memory cells 306 in a selected memory block, an erase voltage (Vers) (e.g., a high positive voltage (such as 20 V or higher)) may be used to couple to a source line 314 of a selected memory block and a unselected memory block in the same plane as the selected memory block. It is to be understood that in some examples, the erase operation may be performed at a half memory block level, a quarter memory block level, or a level having any suitable number of memory blocks or any suitable fraction of a memory block. The memory cells 306 of adjacent memory strings 308 may be coupled through a word line 318, and the word line 318 selects which row of the memory cells 306 is affected by the read and program operations. In some implementations, each word line 318 is coupled to a memory page 320 of the memory cells 306. A size of one memory page 320 in bits can relate to a number of memory strings 308 coupled by the word line 318 in one memory block 304. Each word line 318 may comprise a plurality of control gates (gate electrodes) at each memory cell 306 in the corresponding memory page 320 and a gate line coupling the control gates.

Figure 4:
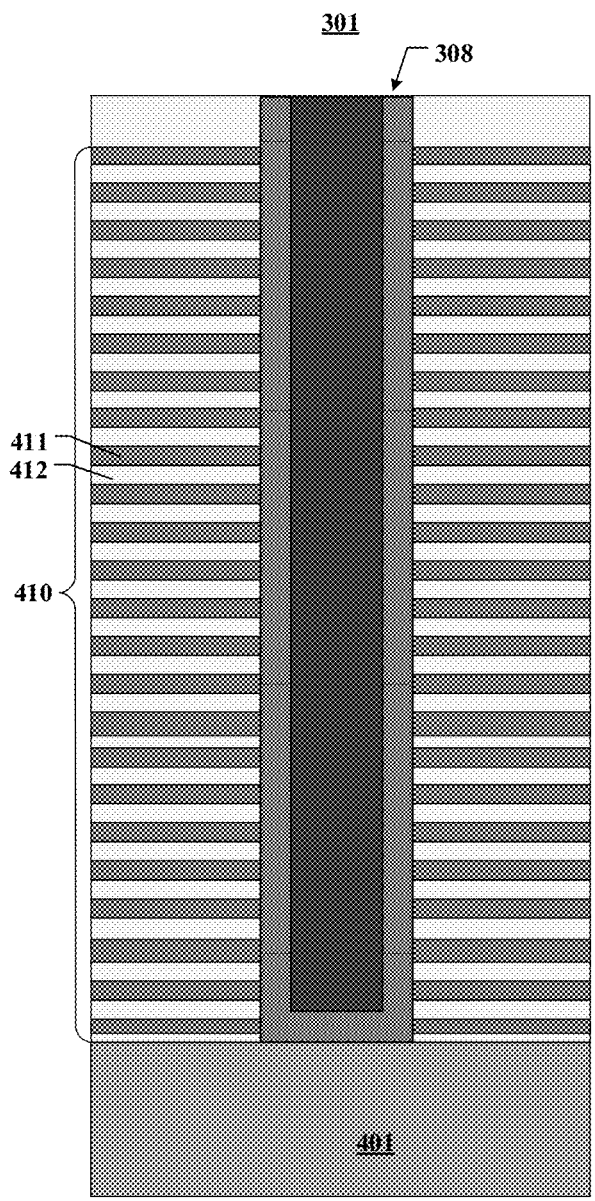
FIG. 4 is a schematic sectional diagram of a memory array comprising a memory string according to an example of the present disclosure.

FIG. 4 shows a schematic sectional diagram of an example memory array 301 comprising a memory string 308 according to some aspects of the present disclosure. As shown in FIG. 4, the memory string 308 may comprise a stack structure 410 which comprises a plurality of gate layers 411 and a plurality of insulation layers 412 that are disposed in a stack alternately and sequentially, and the memory string 308 penetrating through the gate layers 411 and the insulation layers 412 vertically. The gate layers 411 and the insulation layers 412 may be stacked alternately, and two adjacent ones of the gate layers 411 are separated by one insulation layer 412. A number of memory cells that are included in the memory array 301 is mainly related to a number of pairs of the gate layers 411 and the insulation layers 412 in the stack structure 410.

A constituent material of the gate layers 411 may include a conductive material. The conductive material includes, but is not limited to, tungsten (W), cobalt (Co), copper (Cu), aluminum (Al), polysilicon, doped silicon, silicide, or any combination thereof. In some implementations, each gate layer 411 includes a metal layer, e.g., a tungsten layer. In some implementations, each gate layer 411 includes a doped polysilicon layer. Each gate layer 411 may comprise a control gate around the memory cell. The gate layer 411 at a top of the stack structure 410 may extend laterally as a top select gate line, the gate layer 411 at a bottom of the stack structure 410 may extend laterally as a bottom select gate line, and the gate layer 411 extending laterally between the top select gate line and the bottom select gate line may act as a word line layer.

In some examples, the stack structure 410 may be disposed on a substrate 401. The substrate 401 may include silicon (e.g., monocrystalline silicon), silicon germanium (SiGe), gallium arsenide (GaAs), germanium (Ge), silicon on insulator (SOI), germanium on insulator (GOI), or any other suitable materials.

In some examples, the memory string 308 comprises a channel structure extending through the stack structure 410 vertically. In some implementations, the channel structure comprises a channel hole filled with (one or more) semiconductor materials (e.g., as a semiconductor channel) and (one or more) dielectric materials (e.g., as a memory film). In some implementations, the semiconductor channel includes silicon, e.g., polysilicon. In some implementations, the memory film is a composite dielectric layer comprising a tunneling layer, a storage layer (also referred to as a "charge trap/storage layer"), and a barrier layer. The channel structure may have a cylindrical shape (e.g., a pillar shape). According to some implementations, the semiconductor channel, the tunneling layer, the storage layer, and the barrier layer are arranged radially from a center toward an outer surface of the pillar in this order. The tunneling layer may include silicon oxide, silicon oxynitride, or any combination thereof. The storage layer may include silicon nitride, silicon oxynitride, or any combination thereof. The barrier layer may include silicon oxide, silicon oxynitride, a high dielectric constant (high-k) dielectric, or any combination thereof. In an example, the memory film may include a composite layer of silicon oxide/silicon oxynitride/silicon oxide (ONO).

Figure 5:
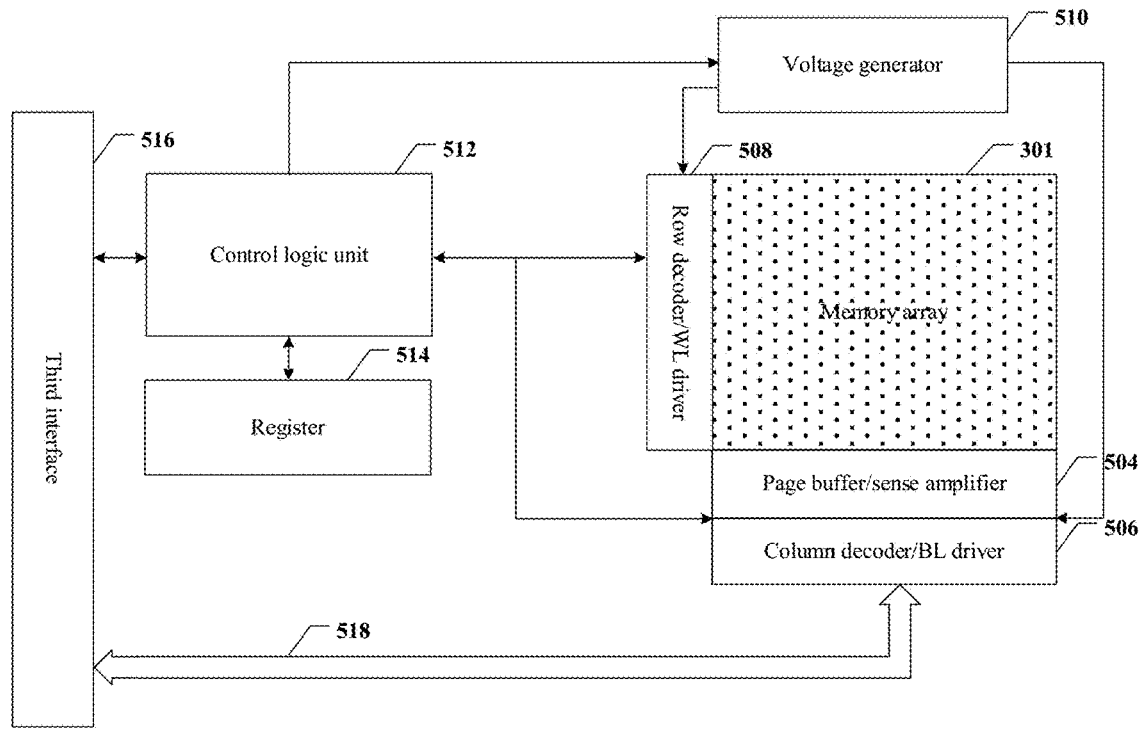
FIG. 5 is a schematic diagram of an example memory comprising a memory array and a peripheral circuit according to an example of the present disclosure.

Referring back to FIG. 3, the peripheral circuit 302 may be coupled to the memory array 301 through bit lines 316, word lines 318, source lines 314, BSLs 315, and TSLs 313. The peripheral circuit 302 may include any suitable analog, digital, and hybrid signal circuits for facilitating operations of the memory array 301 by applying a voltage signal and/or a current signal to each target memory cell 306 and sensing a voltage signal and/or a current signal from each target memory cell 306 through the bit lines 316, the word lines 318, the source lines 314, the BSLs 315, and the TSLs 313. The peripheral circuit 302 may include various types of peripheral circuits formed using a metal-oxide-semiconductor technology. For example, FIG. 5 shows some example peripheral circuits. The peripheral circuit 302 comprises a page buffer/sense amplifier 504, a column decoder/bit line driver 506, a row decoder/word line driver 508, a voltage generator 510, a control logic unit 512, a register 514, a third interface 516, and a data bus 518. It is to be understood that in some examples, an additional peripheral circuit not shown in FIG. 5 may be included as well.

The page buffer/sense amplifier 504 may be configured to read and program (write) data from and to the memory array 301 according to control signals from the control logic unit 512. In an example, the page buffer/sense amplifier 504 may store one page of program data (write data) to be programmed into one page 320 of the memory array 301. In another example, the page buffer/sense amplifier 504 may perform a program verify operation to ensure that data is properly programmed into the memory cells 306 that are coupled to a selected word line 318. In yet another example, the page buffer/sense amplifier 504 may also sense low power signals from the bit lines 316 that represent data bits stored in the memory cells 306, and amplify small voltage swings to recognizable logic levels in the read operation. The column decoder/bit line driver 506 may be configured to be controlled by the control logic unit 512 and select one or more memory strings 308 by applying a bit line voltage generated from the voltage generator 510.

The row decoder/word line driver 508 may be configured to be controlled by the control logic unit 512, select/unselect the memory blocks 304 of the memory array 301, and select/unselect the word lines 318 of the memory blocks 304. The row decoder/word line driver 508 may be further configured to drive the word lines 318 using a word line voltage generated from the voltage generator 510. In some implementations, the row decoder/word line driver 508 may further select/unselect and drive the BSLs 315 and the TSLs 313. As described below in detail, the row decoder/word line driver 508 is configured to perform the program operation on the memory cells 306 that are coupled to (one or more) selected word lines 318. The voltage generator 510 may be configured to be controlled by the control logic unit 512 and generate the word line voltage (e.g., a read voltage, a program voltage, a pass voltage, a local voltage, and a verify voltage, etc.), the bit line voltage, and a source line voltage to be supplied to the memory array 301.

The control logic unit 512 may be coupled to each peripheral circuit described above and configured to control operations of each peripheral circuit. The register 514 may be coupled to the control logic unit 512 and include a state register, a command register, and an address register for storing state information, a Command Operation codes (OP code), and a command address for controlling the operations of each peripheral circuit. The third interface 516 may be coupled to the control logic unit 512, and act as a control buffer to buffer and relay a control command received from a host (not shown) to the control logic unit 512 and to buffer and relay state information received from the control logic unit 512 to the host. The third interface 516 may be also coupled to the column decoder/bit line driver 506 via the data bus 518 and act as a data I/O interface and a data buffer to buffer and relay data to the memory array 301 or relay or buffer data from the memory array 301.

Figure 6:
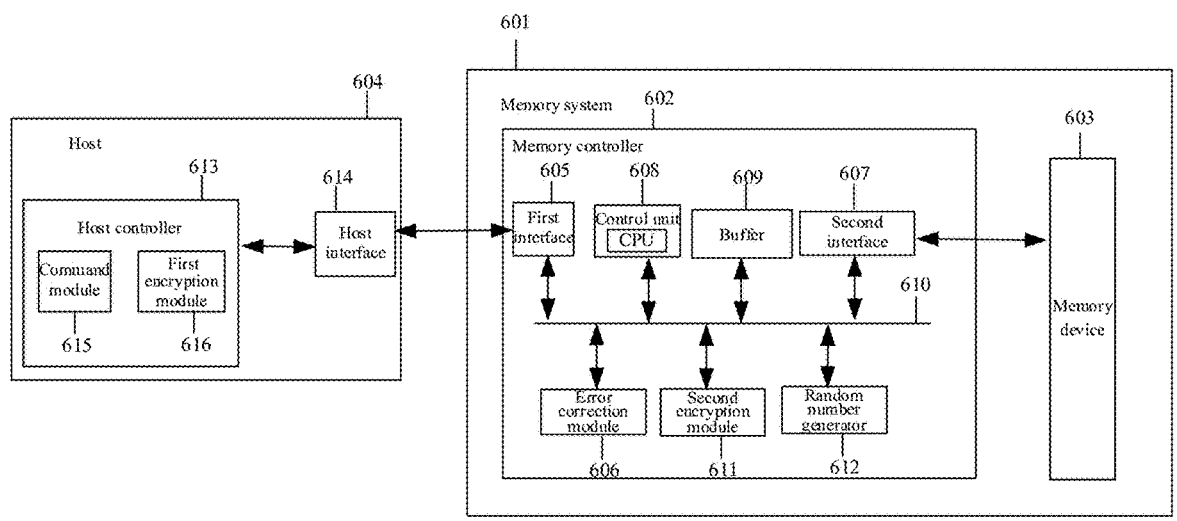
FIG. 6 is a schematic diagram of a frame structure of an electronic apparatus according to an example of the present disclosure.

FIG. 6 shows a constituent block diagram of an electronic apparatus, which comprises a host and a memory system, wherein the memory system 601 comprises: a memory controller 602 and a memory device 603, and the memory controller 602 is configured to control the memory device 603 to perform read and write operations. Here, the memory controller 602 and the memory device 603 may be coupled in any suitable way. The memory controller 602 comprises a control unit (CPU) 608, a buffer 609, an error correction module 606, a first interface 605, a second interface 607, a second encryption module 611, and a random number generator 612. In the examples of the present disclosure, the memory device 603 may be a semiconductor memory storing data in a non-volatile manner, e.g., a NAND memory. The memory system 601 is connected with the host 604. The first interface 605 outputs a command and valid data (write data), etc. received from the host 604 to a first internal bus 610 in the memory system 601, and sends the valid data (the write data) read from the memory device 603, and a response from the control unit 608, etc. to the host 604.

The second interface 607 controls processing of writing and reading data, etc. to and from the memory device 603 based on an instruction of the control unit 608. The control unit 608 controls the memory system 601 integrally, and is, for example, a central processing unit (CPU), and a microprocessing unit (MPU), etc. In a case of receiving a command from the host 604 via the first interface 605, the control unit 608 performs control according to the command. For example, the control unit 608 instructs the second interface 607 to write the data to the memory device 603 according to the command from the host 604. Furthermore, the control unit 608 instructs the second interface 607 to read the data from the memory device 603 according to the command from the host 604.

The data buffer 609 temporarily saves the data received from the host 604 before storing it to the memory device 603, and temporarily saves the data read from the memory device 603 before sending it to the host 604.

The error correction module 606 is a data encoding and decoding unit. Due to an inherent error rate of a flash memory, in order to ensure data correctness, Error Checking and Correcting (ECC) check protection should be added to original data during a data write operation, which is an encoding process. During data reading, decoding is also required to check and correct an error. If a number of error bits exceeds an ECC error correction capability, the data is uploaded to the host in an "uncorrectable" form. ECC encoding and decoding processes here are completed by the error correction module 606.

The host 604 comprises a host controller 613 and a host interface 614, wherein the host controller 613 comprises a command module 615 and a first encryption module 616, and the host interface 614 receives a command, and valid data (written data), etc. received from the memory system 601, and sends a command generated by the command module 615, as well as data in the host, to the memory system 601.

User data is generally stored in the memory device within the memory system, and firmware is stored in the memory controller. Operations of the memory system may be implemented by running the firmware stored in the memory system. If the memory system is accessed by an unauthorized user, a breach or malicious modification of important data in the memory device, or a malicious replacement of the firmware in the memory controller may be caused. Considering the security, the memory system may be set to a locked state by default. Many commands (such as read and write commands) are not executable when the memory system is in the locked state. An authorized user is required to first send a command for authentication, so as to unlock the memory system. Execution of the read/write command is allowed only after unlocking succeeds. However, in some examples, a mechanism for authenticating the memory system is weak and even may be cracked by the unauthorized user. Once cracked, it is easy to be attacked by commands sent maliciously, posing a significant security risk to the memory system.

How to improve the security of the memory system becomes an urgent problem to be solved.

Figure 7:
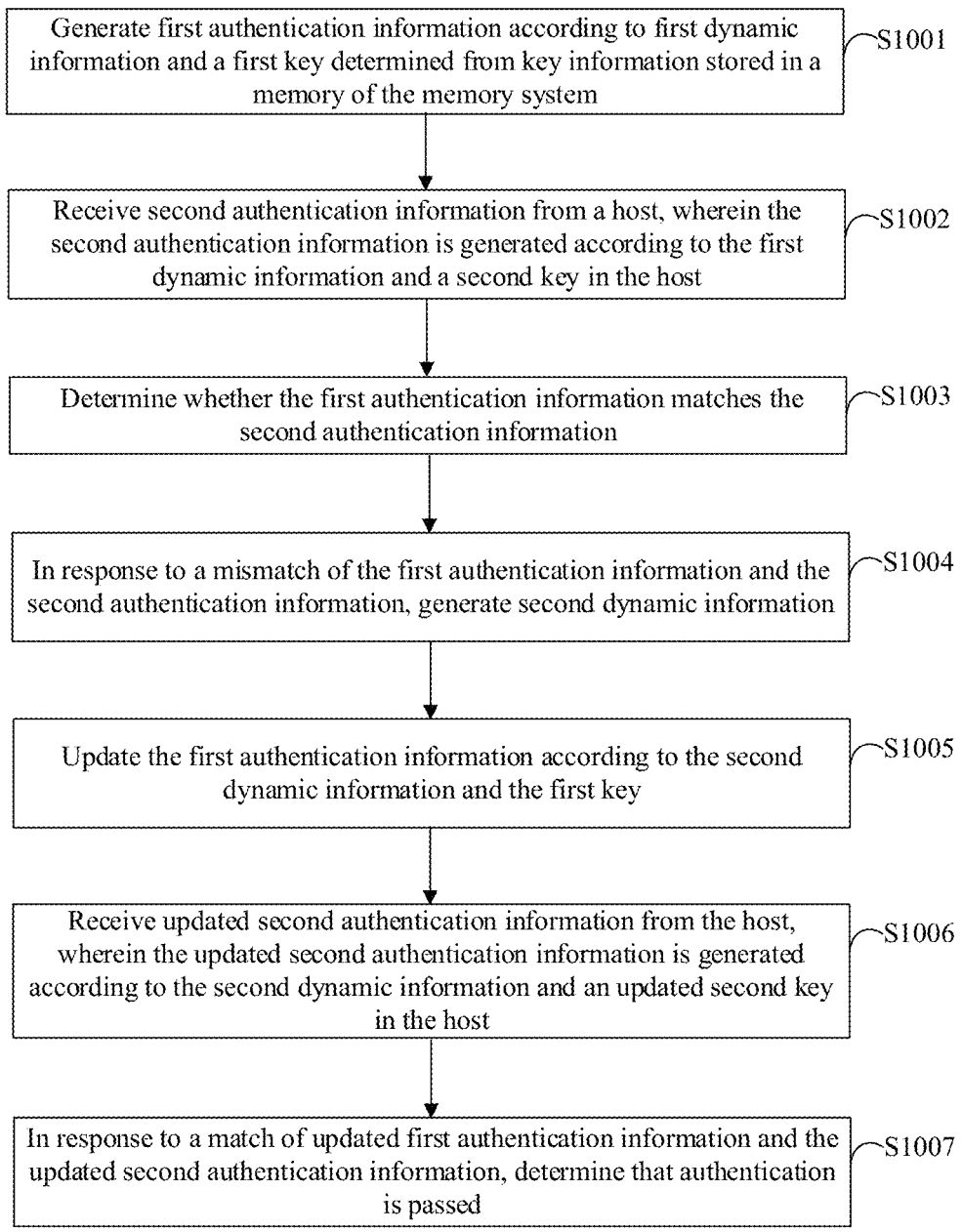
FIG. 7 is an implementation flow diagram of an operation method of a memory system according to an example of the present disclosure.

Based on one or more of the above-mentioned problems, examples of the present disclosure provide an operation method of a memory system. As shown in FIG. 7, the method comprises:

Operation S1001: generating first authentication information according to first dynamic information and a first key determined from key information stored in a memory of the memory system;

Operation S1002: receiving second authentication information from a host, wherein the second authentication information is generated according to the first dynamic information and a second key in the host;

Operation S1003: determining whether the first authentication information matches the second authentication information;

Operation S1004: in response to a mismatch of the first authentication information and the second authentication information, generating second dynamic information;

Operation S1005: updating the first authentication information according to the second dynamic information and the first key;

Operation S1006: receiving updated second authentication information from the host, wherein the updated second authentication information is generated according to the second dynamic information and an updated second key in the host; and Operation S1007: in response to a match of updated first authentication information and the updated second authentication information, determining that authentication is passed.

In the examples of the present disclosure, in the first aspect, the first authentication information is generated according to the first dynamic information and the first key, the second authentication information is generated according to the first dynamic information and the second key, and whether the authentication is passed is determined by determining whether the first authentication information and the second authentication information match, so that compared with directly comparing the first key and the second key to determine whether the authentication is passed, the security may be improved. In the second aspect, in a case where a last time of authentication fails, the second dynamic information is generated during a reauthentication process, and different dynamic information is generated each time, thus increasing difficulty of maliciously unlocking the memory system and thereby further improving the security of the memory system.

In some examples, the method further comprises:
before generating the first authentication information, receiving a command of acquiring authorization status information of the memory system, wherein the authorization status information comprises locking status information of the memory system and information of whether the first dynamic information is required to be acquired; and
in response to the authorization status information comprising the information that the first dynamic information is required to be acquired, generating the first dynamic information.

The command of acquiring the authorization status information of the memory system may be sent by the host, and the host may choose to only acquire the locking status information, or choose to acquire the locking status information and the first dynamic information.

Here, the memory system may comprise the memory and a memory controller, wherein the key information is stored in the memory, and an executing subject in the above operation method of the memory system may be the memory controller.

In some examples, the memory controller comprises a random number generator, wherein the first dynamic information and the second dynamic information comprise random numbers generated by the random number generator.

The random number here may be acquired by the random number generator according to a random number seed. The random number seed refers to an initial numerical value used to generate the random number in the random number generator. The random number seed may be acquired using software or hardware. For example, when the random number seed is acquired through hardware, the randomness of the seed is due to that collected hardware information is random, e.g., acoustic, optical, and electrical information of a current environment may be collected, or noise during operation of a computer system: time stamps of Input/Output (I/O) operations, may be collected. The time stamps of the I/O operations include, but are not limited to, input time stamps of a disk, a network, and apparatuses such as a keyboard and a mouse, etc. These time stamps are captured, and a numerical value of a millisecond or microsecond portion thereof is selected, wherein the numerical value of the portion typically has randomness and non-repeatability. The random number seed acquired through hardware is a true random number. The random number seed may also be acquired through software, e.g., acquiring the random number seed through a function seed(a). The a is a numerical value acquired through software or hardware. The random number may be acquired through a function random(b), wherein b is the random number seed.

In some examples, the memory is disposed outside the memory controller, the key information comprises a key set and a key rule, and the key rule is used to select a key from the key set to generate the first key.

In some examples, the memory here may be disposed outside the memory controller, and in an example, the memory here may be a NAND memory device coupled with the memory controller. In some other examples, the memory here may also be other non-volatile memory disposed outside the memory controller. In some other examples, the memory here may also be a non-volatile memory disposed inside the memory controller.

In some examples, the key set may comprise a plurality of keys, and the key rule specifies a rule of selecting a key from the key set.

In some examples, the method further comprises:
sending a command of reading the key information in the memory, and storing the key information in the memory controller, so as to generate the first key in the memory controller.

Here, the memory controller may directly load the key information stored in the memory, so as to generate the first key in the memory controller. The memory controller may generate the first authentication information by causing the first dynamic information and the first key to be subjected to an encryption algorithm, e.g., a hash algorithm.

It is to be understood that, in the examples of the present disclosure, instead of directly comparing the first key in the memory controller with the second key input by a host side, the first key and the first dynamic information are encrypted using the encryption algorithm to generate the first authentication information, and the second key and the first dynamic information are encrypted using an encryption algorithm to generate the second authentication information. As the first dynamic information is a random number, the security is higher.

In some examples, the second authentication information in the host is generated according to the first dynamic information sent by the memory controller to the host and the second key in the host. The second key here may be input by a user terminal, and in an example may be generated by a user reading the key information. The memory for storing the key information may include a plurality of memories or only one memory. In an example, the key information may be stored only in the NAND memory device, and the key information may be also stored respectively in the NAND memory device and other non-volatile memories disposed outside the memory controller. The first key may be generated by loading the key information in the NAND memory device, and the second key may be generated by reading the key information in other non-volatile memories, or the first key and the second key may be both generated according to the key information in the NAND memory device.

It is to be understood that, an authorized user knows the location in the memory where the key information is stored. For example, the key information may be disposed in a byte segment of a byte file of the memory. The key information may be acquired accurately only when the particular byte segment where the key information is saved is known, and thus the correct second key is entered, so that the first key matches the second key, causing the generated first authentication information to match the second authentication information. However, when the user does not know the location in the memory where the key information is stored, the correct key information may not be acquired, and thus a wrong second key is entered, so that the second key does not match the first key, causing the first authentication information not to match the second authentication information.

When the first authentication information does not match the second authentication information, it indicates that the second key entered by the user is wrong, the memory system cannot be unlocked successfully, the authentication is not passed, and reauthentication is required. In the examples of the present disclosure, in a case where the first authentication information does not match the second authentication information, the second dynamic information is generated for the reauthentication.

It may be understood that, as the second dynamic information is different from the first dynamic information, the difficulty of deciphering the authentication information is increased, thereby enhancing the security.

During the reauthentication process, the memory controller generates the updated first authentication information according to the second dynamic information and the first key. The user may update the second key on the host side. The host generates the updated second authentication information through an updated second key and the second dynamic information, and sends the updated second authentication information to the memory controller. After receiving the updated second authentication information, the memory controller determines whether the updated first authentication information matches the updated second authentication information. When the updated first authentication information matches the updated second authentication information, it indicates that the authentication is passed.

In some examples, the method further comprises:
in response to a mismatch of the updated first authentication information and the updated second authentication information, determining that the authentication is not passed.

In some examples, in a case where the reauthentication is not passed, whether reauthentication is to be performed again may be determined according to authentication duration and a number of times of authentication.

In some examples, the method further comprises:
when determining that the authentication is not passed according to the updated first authentication information and the updated second authentication information and the authentication duration is greater than a first preset value, or when determining that the authentication is not passed according to the updated first authentication information and the updated second authentication information and the number of times of authentication is greater than a second preset value, then the authentication fails and reauthentication is disallowed.

In some examples, when the authentication is determined as being not passed according to the updated first authentication information and the updated second authentication information, the authentication duration is less than or equal to the first preset value, and the number of times of authentication is less than or equal to the second preset value, a reauthentication is allowed.

In an example, the first preset value here may be 30 seconds. In an example, the second preset value here may be 3 times. It is to be noted that the values of the first preset value and the second preset value here are only example illustrations and are not intended to limit the values of the first preset value and the second preset value in the present disclosure. In some examples, the first preset value and the second preset value may be set according to user demands.

It may be understood that, in the examples of the present disclosure, if a second time of authentication still fails, whether reauthentication is allowed is determined through the authentication duration or the number of times of authentication, so that a problem of reduced difficulty of maliciously cracking the authentication information caused by unlimited times of authentication or excessively long authentication duration may be improved, thereby further improving the security.

In some examples, the method further comprises:
if the authentication is passed, allowing execution of a received read instruction and/or write instruction; and
if the authentication is not passed, disallowing the execution of the received read instruction and/or write instruction.

When read and/or write operations are required to be performed on the memory system, authentication may be performed on the memory system first. In a case where the authentication is passed, the read and/or write operations on the memory system may be allowed. That is, in the case where the authentication is passed, if the memory system receives the read instruction and/or the write instruction, the execution of the received read instruction and/or write instruction may be allowed.

Figure 8:
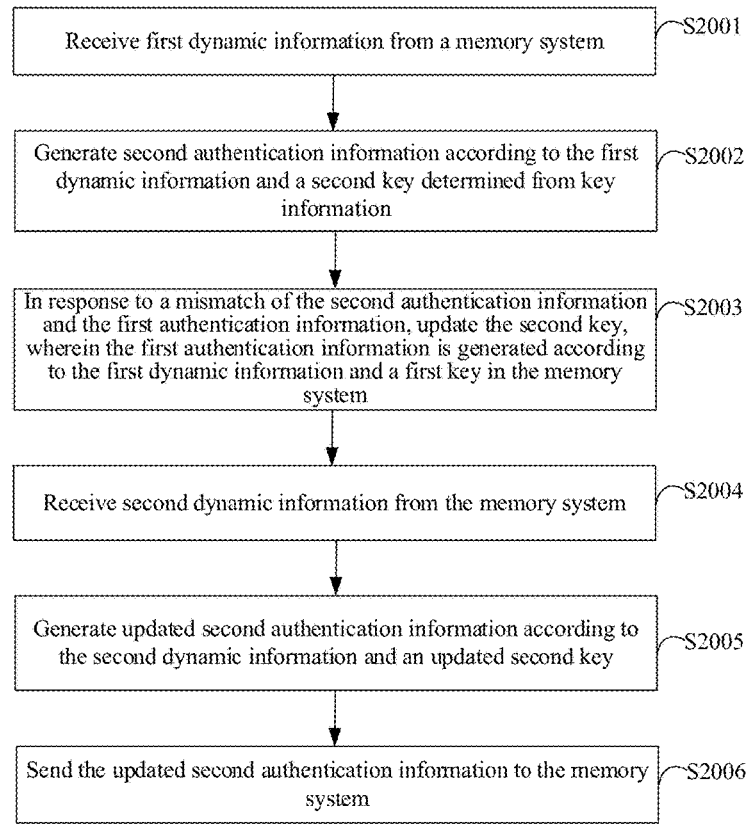
FIG. 8 is an implementation flow diagram of an operation method of a host according to an example of the present disclosure.

Examples of the present disclosure provide an operation method of a host, as shown in FIG. 8, which comprises:
Operation S2001: receiving first dynamic information from a memory system;
Operation S2002: generating second authentication information according to the first dynamic information and a second key determined from key information;

Operation S2003: in response to a mismatch of the second authentication information and the first authentication information, updating the second key, wherein the first authentication information is generated according to the first dynamic information and a first key in the memory system;

Operation S2004: receiving second dynamic information from the memory system;

Operation S2005: generating updated second authentication information according to the second dynamic information and an updated second key; and Operation S2006: sending the updated second authentication information to the memory system.

In some examples, the method further comprises:
acquiring the key information in the memory according to a location of the key information stored in the memory, wherein the key information comprises a key set and a key rule, and the key rule is used to select a key from the key set to generate the first key.

Figure 9:
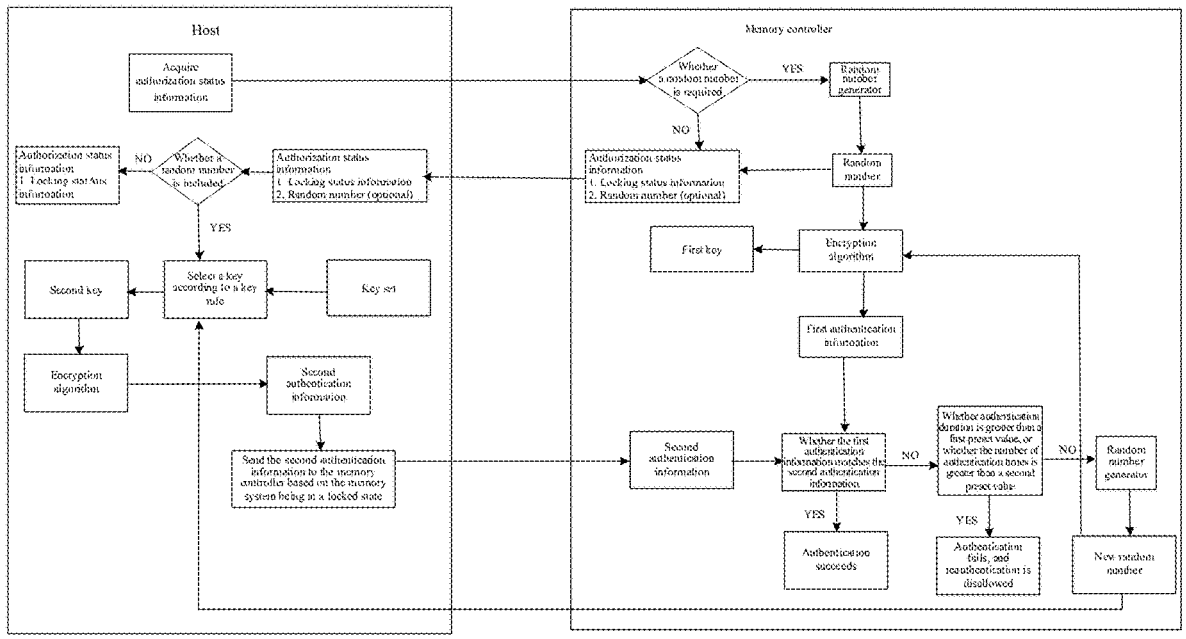
FIG. 9 is a frame flow diagram of memory system authentication according to an example of the present disclosure.

FIG. 9 is a frame flow diagram of memory system authentication according to an example of the present disclosure. The above operation method of a host and the operation method of a memory system are further introduced below in combination with FIG. 9 and FIG. 6.

As shown in FIG. 9, the command module 615 in the host controller 613 generates the command of acquiring the authorization status information of the memory system 601, and sends, through the host interface 614, the command of acquiring the authorization status information of the memory system 601. After receiving the command of acquiring the authorization status information of the memory system 601, the memory controller 602 in the memory system 601 determines whether a random number is required to be generated. When determining that the random number is required to be generated and after generating the random number through the random number generator 612, the memory controller 602 sends the acquired authorization status information of the memory system 601 to the host 604, wherein the authorization status information comprises the locking status information of the memory system 601 and the acquired random number. When determining that no random number is required to be generated, without generating a random number, the memory controller 602 directly sends the acquired authorization status information of the memory system 601 to the host 604, wherein the authorization status information comprises the locking status information of the memory system 601.

After acquiring the authorization status information, the host controller 613 in the host 604 determines whether the authorization status information comprises the random number. When no random number is included, the host 604 acquires the locking status information of the memory system 601; when the random number is included, the host controller 613 acquires the second key from the key set according to the key rule. The first encryption module 616 in the host controller acquires the second authentication information according to an encryption algorithm, e.g., a hash algorithm. Next, the command module 615 in the host controller 613 generates, based on the memory system being in the locked state, a command of sending the second authentication information to the memory controller 602 in the memory system 601, to send the second authentication information to the memory controller 602 in the memory system 601 through the host interface 614.

After generating the random number, the memory controller 602 generates the first key from the key information loaded in the memory device 603. The second encryption module 611 in the memory controller 602 acquires the first authentication information according to an encryption algorithm, e.g., a hash algorithm. The memory controller 602 determines whether the first authentication information matches the received second authentication information from the host 604; in a case of a match, the authentication is passed, and in a case of a mismatch, the authentication is not passed. In the case of the mismatch, the memory controller 602 determines whether the authentication duration is greater than the first preset value, or determines whether the number of times of authentication is greater than the second preset value. When the authentication duration is greater than the first preset value, or the number of times of authentication is greater than the second preset value, the authentication fails and reauthentication is disallowed; when the authentication duration is less than or equal to the first preset value and the number of times of authentication is less than or equal to the second preset value, a new random number is generated using the random number generator 612. The memory controller 602 sends the new random number to the host 604. After the host interface 614 receives the new random number, the user obtains a new second key from the key set according to the key rule. The first encryption module 616 in the host controller 613 obtains the updated second authentication information according to the encryption algorithm. Then the command module 615 in the host controller 613 generates a command of sending the updated second authentication information to the memory system 601. The memory controller 602 generates the updated first authentication information using the encryption algorithm according to the updated random number and the first key. The host interface 614 sends the updated second authentication information to the memory controller 602 in the memory system 601 for reauthentication.

Based on the above operation method of a memory system, examples of the present disclosure further provide a memory system, which comprises:
a memory configured to store key information; and
a memory controller coupled with the memory and configured to:
generate first authentication information according to first dynamic information and a first key determined from the key information;
receive second authentication information from a host, wherein the second authentication information is generated according to the first dynamic information and a second key in the host;
determine whether the first authentication information matches the second authentication information;
in response to a mismatch of the first authentication information and the second authentication information, generate second dynamic information;
update the first authentication information according to the second dynamic information and the first key;
receive updated second authentication information from the host, wherein the updated second authentication information is generated according to the second dynamic information and an updated second key in the host; and
in response to a match of updated first authentication information and the updated second authentication information, determine that authentication is passed.

In some examples, the memory controller comprises a random number generator, wherein the first dynamic information and the second dynamic information comprise random numbers generated by the random number generator.

In some examples, the memory controller is further configured to:
before generating the first authentication information, receive a command of acquiring authorization status information of the memory system, wherein the authorization status information comprises locking status information of the memory system and information of whether the first dynamic information is required to be acquired; and
in response to the authorization status information comprising the information that the first dynamic information is required to be acquired, generate the first dynamic information.

In some examples, the memory is disposed outside the memory controller, the key information comprises a key set and a key rule, and the key rule is used to select a key from the key set to generate the first key.

In some examples, the memory controller is configured to:
send a command of reading the key information in the memory, and store the key information in the memory controller, so as to generate the first key in the memory controller.

In some examples, the memory controller is configured to:
in response to a mismatch of the updated first authentication information and the updated second authentication information, determine that the authentication is not passed.

In some examples, the memory controller is configured to:
if the authentication is passed, allow execution of a received read instruction and/or write instruction; and
if the authentication is not passed, disallow the execution of the received read instruction and/or write instruction.

In some examples, the memory controller is configured to:
when determining that the authentication is not passed according to the updated first authentication information and the updated second authentication information and the authentication duration is greater than a first preset value, or when determining that the authentication is not passed according to the updated first authentication information and the updated second authentication information and the number of times of authentication is greater than a second preset value, then the authentication fails and reauthentication is disallowed.

In some examples, the memory system comprises a memory card or a solid state drive.

Here, the structure and composition of the memory system may be referred to the above detailed introduction of FIGS. 1, 2A, 2B, 3, 4, 5, and 6. Other details about the memory system are similar to those in the above operation method of a memory system, which are no longer repeated here for simplicity.

Based on the above operation method of a host, examples of the present disclosure further provide a host, which comprises a host controller and a host interface,
the host interface is configured to:
receive first dynamic information from a memory system;
receive second dynamic information from the memory system; and
send updated second authentication information to the memory system;

the host controller is configured to:
generate second authentication information according to the first dynamic information and a second key determined from key information;
in response to a mismatch of the second authentication information and first authentication information, update the second key, wherein the first authentication information is generated according to the first dynamic information and a first key in the memory system; and
generate updated second authentication information according to the second dynamic information and an updated second key.

In some examples, the host controller is configured to:
acquire the key information in the memory according to a location of the key information stored in the memory, wherein the key information comprises a key set and a key rule, and the key rule is used to select a key from the key set to generate the first key.

Based on the above memory system and the host, examples of the present disclosure further provide an electronic apparatus, which comprises a host and a memory system, wherein the memory system comprises a memory and a memory controller coupled with the memory, and the host comprises a host controller and a host interface;
the memory is configured to: store key information;
the memory controller is configured to:
generate first authentication information according to first dynamic information and a first key determined from the key information;
receive second authentication information from the host, wherein the second authentication information is generated according to the first dynamic information and a second key in the host;
determine whether the first authentication information matches the second authentication information;
in response to a mismatch of the first authentication information and the second authentication information, generate second dynamic information;
update the first authentication information according to the second dynamic information and the first key;
receive updated second authentication information from the host, wherein the updated second authentication information is generated according to the second dynamic information and an updated second key in the host; and
in response to a match of updated first authentication information and the updated second authentication information, determine that authentication is passed;
the host interface is configured to:
receive the first dynamic information from the memory system;
receive the second dynamic information from the memory system; and
send the updated second authentication information to the memory system;
the host controller is configured to:
generate the second authentication information according to the first dynamic information and the second key determined from the key information;
in response to a mismatch of the second authentication information and the first authentication information, update the second key; and
generate the updated second authentication information according to the second dynamic information and the updated second key.

Here, the structure and composition of the host and the electronic apparatus may be referred to the above detailed introduction of FIGS. 1 and 6. Other details about the host are similar to those in the above operation method of a host, which are no longer repeated here for simplicity.

According to a first aspect of examples of the present disclosure, a memory system is provided, which comprises:
  a memory configured to store key information; and
  a memory controller coupled with the memory and configured to:
  generate first authentication information according to first dynamic information and a first key determined from the key information;
  receive second authentication information from a host, wherein the second authentication information is generated according to the first dynamic information and a second key in the host;
  determine whether the first authentication information matches the second authentication information;
  in response to a mismatch of the first authentication information and the second authentication information, generate second dynamic information;
  update the first authentication information according to the second dynamic information and the first key;
  receive updated second authentication information from the host, wherein the updated second authentication information is generated according to the second dynamic information and an updated second key in the host; and
  in response to a match of updated first authentication information and the updated second authentication information, determine that authentication is passed.

In some implementations, the memory controller comprises a random number generator, wherein the first dynamic information and the second dynamic information comprise random numbers generated by the random number generator.

In some implementations, the memory controller is further configured to:
  before generating the first authentication information, receive a command of acquiring authorization status information of the memory system, wherein the authorization status information comprises locking status information of the memory system and information of whether the first dynamic information is required to be acquired; and
  in response to the authorization status information comprising the information that the first dynamic information is required to be acquired, generate the first dynamic information.

In some implementations, the memory is disposed outside the memory controller, the key information comprises a key set and a key rule, and the key rule is used to select a key from the key set to generate the first key.

In some implementations, the memory controller is configured to:
  send a command of reading the key information in the memory, and store the key information in the memory controller, so as to generate the first key in the memory controller.

In some implementations, the memory controller is configured to:
  in response to a mismatch of the updated first authentication information and the updated second authentication information, determine that the authentication is not passed.

In some implementations, the memory controller is configured to:
  if the authentication is passed, allow execution of a received read instruction and/or write instruction; and
  if the authentication is not passed, disallow the execution of the received read instruction and/or write instruction.

In some implementations, the memory controller is configured to:
  when determining that the authentication is not passed according to the updated first authentication information and the updated second authentication information and authentication duration is greater than a first preset value, or when determining that the authentication is not passed according to the updated first authentication information and the updated second authentication information and a number of times of authentication is greater than a second preset value, then the authentication fails and reauthentication is disallowed.

According to a second aspect of examples of the present disclosure, a host is provided, which comprises a host controller and a host interface,
  the host interface is configured to:
  receive first dynamic information from a memory system;
  receive second dynamic information from the memory system; and
  send updated second authentication information to the memory system;
  the host controller is configured to:
  generate second authentication information according to the first dynamic information and a second key determined from key information;
  in response to a mismatch of the second authentication information and first authentication information, update the second key, wherein the first authentication information is generated according to the first dynamic information and a first key in the memory system; and
  generate the updated second authentication information according to the second dynamic information and an updated second key.

In some implementations, the host controller is configured to:
  acquire the key information in the memory according to a location of the key information stored in the memory, wherein the key information comprises a key set and a key rule, and the key rule is used to select a key from the key set to generate the first key.

According to a third aspect of examples of the present disclosure, an electronic apparatus is provided, which comprises a host and a memory system, wherein the memory system comprises a memory and a memory controller coupled with the memory, and the host comprises a host controller and a host interface;
  the memory is configured to: store key information;
  the memory controller is configured to:
  generate first authentication information according to first dynamic information and a first key determined from the key information;
  receive second authentication information from the host, wherein the second authentication information is generated according to the first dynamic information and a second key in the host;
  determine whether the first authentication information matches the second authentication information;
  in response to a mismatch of the first authentication information and the second authentication information, generate second dynamic information;
  update the first authentication information according to the second dynamic information and the first key;
  receive updated second authentication information from the host, wherein the updated second authentication information is generated according to the second dynamic information and an updated second key in the host; and in response to a match of updated first authentication information and the updated second authentication information, determine that authentication is passed;

the host interface is configured to:

receive the first dynamic information from the memory system;

receive the second dynamic information from the memory system; and send the updated second authentication information to the memory system;

the host controller is configured to:

generate the second authentication information according to the first dynamic information and the second key determined from the key information;

in response to a mismatch of the second authentication information and the first authentication information, update the second key; and generate the updated second authentication information according to the second dynamic information and the updated second key.

According to a fourth aspect of examples of the present disclosure, an operation method of a memory system is provided, which comprises: generating first authentication information according to first dynamic information and a first key determined from key information stored in a memory of the memory system;

receiving second authentication information from a host, wherein the second authentication information is generated according to the first dynamic information and a second key in the host;

determining whether the first authentication information matches the second authentication information;

in response to a mismatch of the first authentication information and the second authentication information, generating second dynamic information;

updating the first authentication information according to the second dynamic information and the first key;

receiving updated second authentication information from the host, wherein the updated second authentication information is generated according to the second dynamic information and an updated second key in the host; and in response to a match of updated first authentication information and the updated second authentication information, determining that authentication is passed.

In some implementations, the memory controller comprises a random number generator, wherein the first dynamic information and the second dynamic information comprise random numbers generated by the random number generator.

In some implementations, the method further comprises:

before generating the first authentication information, receiving a command of acquiring authorization status information of the memory system, wherein the authorization status information comprises locking status information of the memory system and information of whether the first dynamic information is required to be acquired; and in response to the authorization status information comprising the information that the first dynamic information is required to be acquired, generating the first dynamic information.

In some implementations, the memory is disposed outside the memory controller, the key information comprises a key set and a key rule, and the key rule is used to select a key from the key set to generate the first key.

In some implementations, the method further comprises:

sending a command of reading the key information in the memory, and storing the key information in the memory controller, so as to generate the first key in the memory controller.

In some implementations, the method further comprises:

in response to a mismatch of the updated first authentication information and the updated second authentication information, determining that the authentication is not passed.

In some implementations, the method further comprises:

if the authentication is passed, allowing execution of a received read instruction and/or write instruction; and if the authentication is not passed, disallowing the execution of the received read instruction and/or write instruction.

In some implementations, the method further comprises:

when determining that the authentication is not passed according to the updated first authentication information and the updated second authentication information and authentication duration is greater than a first preset value, or when determining that the authentication is not passed according to the updated first authentication information and the updated second authentication information and a number of times of authentication is greater than a second preset value, then the authentication fails and reauthentication is disallowed.

According to a fifth aspect of examples of the present disclosure, an operation method of a host is provided, which comprises:

receiving first dynamic information from a memory system;

generating second authentication information according to the first dynamic information and a second key determined from key information;

in response to a mismatch of the second authentication information and first authentication information, updating the second key, wherein the first authentication information is generated according to the first dynamic information and a first key in the memory system;

receiving second dynamic information from the memory system;

generating updated second authentication information according to the second dynamic information and an updated second key; and sending the updated second authentication information to the memory system.

In some implementations, the method further comprises:

acquiring the key information in the memory according to a location of the key information stored in the memory, wherein the key information comprises a key set and a key rule, and the key rule is used to select a key from the key set to generate the first key.

According to a sixth aspect of examples of the present disclosure, a computer readable storage medium is provided, storing a computer program which, when executed by a processor, implements the operation method of a host described in any one of the above implementations.

In examples of the present disclosure, in the first aspect, the first authentication information is generated according to the first dynamic information and the first key, the second authentication information is generated according to the first dynamic information and the second key, and whether the authentication is passed is determined by determining whether the first authentication information and the second authentication information match, so that as compared with directly comparing the first key and the second key to determine whether the authentication is passed, the security may be improved; and in the second aspect, in a case where a last time of authentication fails, the second dynamic information is generated during a reauthentication process, and different dynamic information is generated each time, thus increasing difficulty of maliciously unlocking the memory system and thereby further improving the security of the memory system.

Examples of the present disclosure further provide a computer readable storage medium on which a computer program is stored.

In some examples, the computer program, when being executed by a processor, implements the operation method of a memory system described in any one of the above examples.

In some other examples, the computer program, when being executed by a processor, implements the operation method of a host described in any one of the above examples.

Here, all or part of the processes in the methods of the above examples may be implemented by instructing relevant hardware through a computer program. The computer program may be stored in a computer readable storage medium, and when executed, may comprise processes of the examples of each of the above methods. The storage medium may be a magnetic disc, an optical disc, a Read-Only Memory (ROM), a Random Access Memory (RAM), a Flash Memory, a Hard Disk Drive (HDD), or a Solid State Drive, etc.; the storage medium may further include a combination of the above types of memories.

It is to be understood that, references to "one example" or "an example" throughout this specification mean that example features, structures, or characteristics related to examples are included in at least one example of the present disclosure. Therefore, "in one example" or "in an example" presented everywhere throughout this specification does not necessarily refer to the same example. Furthermore, these example features, structures, or characteristics may be incorporated in one or more examples in any suitable manner. It is to be understood that, in various examples of the present disclosure, sequence numbers of the above processes do not indicate an execution sequence, and an execution sequence of various processes shall be determined by functionalities and intrinsic logics thereof, and shall constitute no limitation on an implementation process of the examples of the present disclosure. The above sequence numbers of the examples of the present disclosure are only for description, and do not represent advantages and disadvantages of the examples.

The methods disclosed in several method examples as provided by the present disclosure may be combined freely to obtain new method examples in case of no conflicts.

The above descriptions are merely example implementations of the present disclosure, and the protection scope of the present disclosure is not limited to these. Any variation or replacement that may be readily figured out by those skilled in the art within the technical scope disclosed by the present disclosure shall fall within the protection scope of the present disclosure. Therefore, the protection scope of the present disclosure shall be defined by the protection scope of the claims.

What is claimed is:

1. A memory system, comprising:
   a memory configured to store key information; and
   a memory controller coupled with the memory and configured to:
   generate first authentication information according to first dynamic information and a first key determined from the key information;
   receive second authentication information from a host, wherein the second authentication information is generated according to the first dynamic information and a second key in the host;
   determine whether the first authentication information matches the second authentication information;
   in response to a mismatch of the first authentication information and the second authentication information, generate second dynamic information;
   update the first authentication information according to the second dynamic information and the first key;
   receive updated second authentication information from the host, wherein the updated second authentication information is generated according to the second dynamic information and an updated second key in the host; and
   in response to a match of updated first authentication information and the updated second authentication information, determine that authentication is passed.

2. The memory system of claim 1, wherein the memory controller comprises a random number generator, and the first dynamic information and the second dynamic information comprise random numbers generated by the random number generator.

3. The memory system of claim 1, wherein the memory controller is further configured to:
   before generating the first authentication information, receive a command of acquiring authorization status information of the memory system, wherein the authorization status information comprises locking status information of the memory system and information of whether the first dynamic information is required to be acquired; and
   in response to the authorization status information comprising information that the first dynamic information is required to be acquired, generate the first dynamic information.

4. The memory system of claim 3, wherein the memory is disposed outside the memory controller, the key information comprises a key set and a key rule, and the key rule is used to select a key from the key set to generate the first key.

5. The memory system of claim 4, wherein the memory controller is configured to:
   send a command of reading the key information in the memory; and
   store the key information in the memory controller, so as to generate the first key in the memory controller.

6. The memory system of claim 1, wherein the memory controller is configured to, in response to a mismatch of the updated first authentication information and the updated second authentication information, determine that the authentication is not passed.

7. The memory system of claim 6, wherein the memory controller is configured to:
   in response to passing the authentication, allow execution of a received read instruction and/or write instruction; and
   in response to not passing the authentication, disallow the execution of the received read instruction and/or write instruction.

8. The memory system of claim 6, wherein the memory controller is configured to:
   when determining that the authentication is not passed according to the updated first authentication information and the updated second authentication information and authentication duration is greater than a first preset value, or when determining that the authentication is not passed according to the updated first authentication information and the updated second authentication information and a number of times of authentication is greater than a second preset value, then the authentication fails and reauthentication is disallowed.

9. The memory system of claim 1, wherein the memory system comprises Solid State Drives (SSD).

10. A method of operating a memory system comprising a memory and a memory controller, comprising:
generating first authentication information according to first dynamic information and a first key determined from key information stored in the memory of the memory system;
receiving second authentication information from a host, wherein the second authentication information is generated according to the first dynamic information and a second key in the host;
determining whether the first authentication information matches the second authentication information;
in response to a mismatch of the first authentication information and the second authentication information, generating second dynamic information;
updating the first authentication information according to the second dynamic information and the first key;
receiving updated second authentication information from the host, wherein the updated second authentication information is generated according to the second dynamic information and an updated second key in the host; and
in response to a match of updated first authentication information and the updated second authentication information, determining that authentication is passed.

11. The method of claim 10, wherein the memory controller comprises a random number generator, and the first dynamic information and the second dynamic information comprise random numbers generated by the random number generator.

12. The method of claim 10, further comprising:
before generating the first authentication information, receiving a command of acquiring authorization status information of the memory system, wherein the authorization status information comprises locking status information of the memory system and information of whether the first dynamic information is required to be acquired; and
in response to the authorization status information comprising information that the first dynamic information is required to be acquired, generating the first dynamic information.

13. The method of claim 12, wherein the memory is disposed outside the memory controller, the key information comprises a key set and a key rule, and the key rule is used to select a key from the key set to generate the first key.

14. The method of claim 13, further comprising:
sending a command of reading the key information in the memory; and
storing the key information in the memory controller, so as to generate the first key in the memory controller.

15. The method of claim 10, further comprising, in response to a mismatch of the updated first authentication information and the updated second authentication information, determining that the authentication is not passed.

16. The method of claim 15, further comprising:
if the authentication is passed, allowing execution of a received read instruction and/or write instruction; and
if the authentication is not passed, disallowing the execution of the received read instruction and/or write instruction.

17. The method of claim 15, further comprising:
when determining that the authentication is not passed according to the updated first authentication information and the updated second authentication information and authentication duration is greater than a first preset value, or when determining that the authentication is not passed according to the updated first authentication information and the updated second authentication information and a number of times of authentication is greater than a second preset value, then the authentication fails and reauthentication is disallowed.

18. A computer readable storage medium, storing a computer program which, when executed, may implement a method of operating a memory system comprising:
generating first authentication information according to first dynamic information and a first key determined from key information stored in a memory of the memory system;
receiving second authentication information from a host, wherein the second authentication information is generated according to the first dynamic information and a second key in the host;
determining whether the first authentication information matches the second authentication information;
in response to a mismatch of the first authentication information and the second authentication information, generating second dynamic information;
updating the first authentication information according to the second dynamic information and the first key;
receiving updated second authentication information from the host, wherein the updated second authentication information is generated according to the second dynamic information and an updated second key in the host; and
in response to a match of updated first authentication information and the updated second authentication information, determining that authentication is passed.

19. The computer readable storage medium of claim 18, wherein the method of operating the memory system further comprises:
before generating the first authentication information, receiving a command of acquiring authorization status information of the memory system, wherein the authorization status information comprises locking status information of the memory system and information of whether the first dynamic information is required to be acquired; and
in response to the authorization status information comprising information that the first dynamic information is required to be acquired, generating the first dynamic information.

20. The computer readable storage medium of claim 18, wherein the method of operating the memory system further comprises
in response to a mismatch of the updated first authentication information and the updated second authentication information, determining that the authentication is not passed.

* * * * *

UNITED STATES PATENT AND TRADEMARK OFFICE
CERTIFICATE OF CORRECTION

PATENT NO. : 12,455,693 B2  
APPLICATION NO. : 18/404630  
DATED : October 28, 2025  
INVENTOR(S) : Quan Cheng Page 1 of 1

It is certified that error appears in the above-identified patent and that said Letters Patent is hereby corrected as shown below:

In the Drawings

In FIG. 1, Insert Field --100--.

Signed and Sealed this  
Ninth Day of December, 2025

John A. Squires  
*Director of the United States Patent and Trademark Office*